United States Patent Office 3,039,861  
Patented June 19, 1962

3,039,861  
GLYCINE ALKENYL SUCCINAMIC ACIDS IN DISTILLATE FUELS  
Harry J. Andress, Jr., Pitman, and Paul Y. C. Gee, Woodbury, N.J., assignors to Socony Mobil Oil Company, Inc., a corporation of New York  
No Drawing. Filed Dec. 1, 1959, Ser. No. 856,375  
15 Claims. (Cl. 44—71)

This invention relates to the improvement of non-lubricating petroleum fractions. It is more particularly concerned with distillate fuels containing additives adapted to inhibit the appearance of sediment during prolonged storage periods, to prevent screen-clogging, and to prevent rusting of ferrous metal surfaces in fuel oils and to prevent stalling in gasolines.

It is well known that fuel oils are prone to form sludge or sediment during periods of prolonged storage. This sediment, of course, has an adverse effect on burner operation, because it has a tendency to clog screens and nozzles. In addition to sediment formed during storage, most fuel oils contain other impurities, such as rust, dirt, and entrained water. The sediment and impurities tend to settle out on equipment parts, such as nozzles, screens, filters, etc., thereby clogging them and causing the equipment to fail.

A further factor, incident to the storage and handling of fuel oils, is the "breathing" of storage vessels. This results in the accumulation of considerable amounts of water in the tanks, which presents a problem of rusting in the tanks. Then, when the oil is removed for transportation, sufficient water may be carried along to cause rusting of ferrous metal surfaces in pipelines, tankers, and the like.

As is well known to those skilled in the art, frequent stalling of automobile engines, especially during the warmup period, has been a common occurrence. This difficulty is most pronounced in postwar cars having automatic transmissions and a consequent limit on the maximum permissible idle speed, although it also occurs in cars without automatic transmissions. Stalling of this type, of course, is a definite safety hazard, as well as a decided inconvenience in frequent restarting of the engine.

It is now recognized that stalling during the warmup period is attributable to the formation of ice on the throttle plate and the carburetor barrel near it. The water which forms the ice does not come from the gasoline, i.e., as entrained water, but from the air that enters the carburetor. As has been mentioned hereinbefore, stalling generally occurs in cool, humid weather, when the temperatures are above about 30° F. and below about 60° F. and the relative humidity is about 65 percent and higher, up to 100 percent. The most critical conditions are temperatures of 35–40° F. and 100 percent relative humidity.

As the gasoline evaporates in the carburetor, it reduces the temperature of the surrounding metal by as much as 40° F. Moisture in the incoming air comes in contact with these parts and begins to build up ice on the throttle plate and in the carburetor barrel. The more moist this air is, the greater the buildup of ice. Then, when the engine is idled, the throttle plate closes and the ice chokes off the normal small flow of air through the small clearance between the throttle plate and the carburetor wall. This causes the engine to stall. The engine can usually be restarted when the heat from the exhaust manifold melts the ice sufficiently. However, stalling will continue until the engine is completely warmed up.

Icing may also occur in the carburetors of some vehicles when cruising at speeds of 30–60 m.p.h. Such icing is a particular problem in the case of certain trucks and cars equipped with carburetors having Venturi-type fuel-air mixing tubes (emulsion tubes). Such carburetors are found in trucks and in many European cars. The ice builds up in the tube and restricts the flow of air, thereby enriching the fuel mixture and reducing efficiency. Eventually the engine may stall.

Gasoline is a mixture of hydrocarbons having an initial boiling point falling between about 75° F. and about 135° F. and an end-boiling point falling between about 250° F. and about 450° F. The boiling range of the gasoline, of course, reflects on its volatility. Thus, a higher boiling gasoline will be less volatile and give less stalling difficulty. It has been proposed in the art that a gasoline having an A.S.T.M. mid-boiling (50%) point of 310° F. or higher will not be subject to stalling. Although this may be the case for a given series of gasolines, however, it is not the sole and controlling factor. Gasolines of higher mid-boiling point but a low initial boiling point (e.g., full boiling range gasolines) can induce stalling when the aforementioned stall-inducing atmospheric conditions are prevalent. Thus, any gasoline will give difficulty in damp, cool weather. In modern engine operation, however, control of stalling by means of volatility is not feasible, because other performance characteristics are affected.

Generally, it has been the practice to overcome the aforedescribed fuel difficulties with a separate additive for each purpose, i.e., with a sediment inhibitor, an anti-screen clogging agent, an antirust agent and a deicer. In some cases several of these difficulties have been overcome with one additive. It is highly desirable, from the standpoint of the number of additives necessary in the blending plant, that one additive can be used for many purposes.

It has now been found that all four problems, enumerated above, can be solved by the use of a single addition agent. It has been discovered that certain amic acids and amine salts, and amides thereof are effective to inhibit fuels against all four aforementioned difficulties.

Accordingly, it is a broad object of this invention to provide a fuel having properties improved with a minimum number of addition agents. Another object is to provide a single additive adapted to inhibit sedimentation, to prevent screen clogging, to prevent rusting of ferrous metal surfaces and to inhibit carburetor icing. A specific object is to provide certain novel amic acids or amine salts or amides thereof and fuels containing them. Other objects and advantages of this invention will become apparent to those skilled in the art from the following detailed description.

The present invention provides (1) amic acids of glycine and alkenyl succinic acid anhydride, (2) amic acids of anthranilic acid and alkenyl succinic acid anhydrate, and (3) the mono- and di-salts of (1) and (2) with tertiary-alkyl primary amines having a tertiary carbon atom attached to the nitrogen atom and containing between about 4 carbon atoms and about 30 carbon atoms per tertiary-alkyl radical, and (4) monoamides and di-amides of (1) and (2) with tertiary-alkyl primary amines having a tertiary carbon atom attached to the nitrogen atom and containing between about 4 carbon atoms and about 30 carbon atoms per tertiary-alkyl radical; and distillate fuels containing them.

The novel addition agents of this invention are amic acids obtained by condensing equimolar amounts of an alkenyl succinic acid anhydride and an amino compound reactant, without formation of water of condensation. The amino compound reactants contemplated are glycine (aminoacetic acid) and anthranilic acid (2-aminobenzoic acid). The condensation takes place readily upon heating the acid anhydride reactant and the amino compound reactant at temperatures ranging from ambient temperatures and upwards. The reaction is an amide formation reaction effected by the well-known addition of the anhydride group to an amino group. This addition proceeds at any temperature but temperatures of between about 90° C. and about 120° C. are preferred. The time of reaction is dependent on the size of the charge and the reaction temperature selected. Ordinarily addition of the acid anhydride is substantially complete within a few minutes. In order to ensure complete reaction, however, it is preferred to continue heating for several hours, even as much as 10 hours. In general, the reaction time varies between several minutes and about ten hours. If desired, non-polar solvents, such as benzene, toluene, kerosines, and xylene, can be used to improve fluidity.

The alkenyl succinic acid anhydride reactant can have between 8 and 35 carbon atoms in the alkenyl radical, and preferably between 10 and 14 carbon atoms. Non-limiting examples of the alkenyl succinic acid anhydride reactants are octenyl succinic acid anhydride, diisobutenyl succinic acid anhydride, 2-methylheptenyl succinic acid anhydride, 4-ethylhexenyl succinic acid anhydride, nonenyl succinic acid anhydride, decenyl succinic acid anhydride, undecenyl succinic acid anhydride, dodecenyl succinic acid anhydride, triisobutenyl succinic acid anhydride, tetrapropenyl succinic acid anhydride, tetradecenyl succinic acid anhydride, hexadecenyl succinic acid anhydride, 11-tricosenyl succinic acid anhydride, and 17-pentatriacontenyl succinic acid anhydride.

Although the anhydride is preferred, the compounds of this invention can be prepared from the corresponding alkenyl succinic acid. In this case, the condensation with amino compound reactant is accompanied by formation of one mole of water per mole of amine. The reaction, in this case, is carried out at temperatures of between about 130° C. and about 200° C., although the reaction can be effected at temperatures above and below this range. The reaction will proceed until one mole of water is evolved per mole of alkenyl succinic acid reactant, usually six to ten hours. In order to facilitate the removal of water, to effect a more complete reaction in accordance with the principle of Le Chatelier, a hydrocarbon solvent which forms an azeotropic mixture with water can be added to the reaction mixture. Heating is continued until removal of water by azeotropic distillation has substantially ceased. Examples of well-known solvents that form azeotropes are benzene, toluene, and xylene.

The salt of the amic acid can be made readily by warming the amic acid and a tertiary-alkyl primary amine, in suitable proportions. In the case of the mono-amine salt, equimolar quantities of the amine and amic acid are used. For the di-amine salt, two moles of the amine are used per mole of amic acid. In the di-amine salt the two mole proportions of the amine can be the same amine or two or more different amines, of the types more specifically defined hereinafter.

The amide of the amic acid can be prepared by any of the usual amide-forming reactions. Most readily it is prepared by reacting the amic acid and the tertiary-alkyl primary amine, in molar amounts, and with removal of a mole of water of condensation. The reaction conditions used are those defined hereinbefore for reacting the alkenyl succinic acid with the amine compound reactant.

Each of the amic acid types contemplated in the present invention can have two structural forms. When using glycine the structures are:

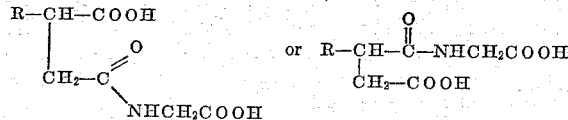

and in the case of anthranilic acid:

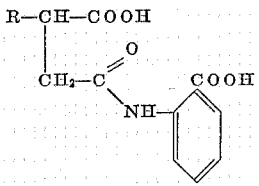

or

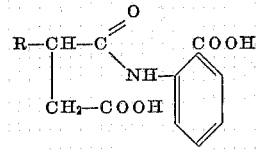

wherein R, in each case, is an alkenyl branched chain radical having between about 8 carbon atoms and about 35 carbon atoms. In each case, the product can be predominantly one or the other isomer, or even mixtures of the two. For this reason, the amic acids of this invention are more accurately defined in the terms of the method by which they are made.

The amines utilizable in forming the salts of the amic acids are the tertiary-alkyl, primary, monoamines in which a primary amino (—NH$_2$) group is attached to a tertiary carbon atom and which contain between about 4 carbon atoms and about 30 carbon atoms in the tertiary-alkyl radical; and mixtures thereof. These amines all contain the terminal group,

Nonlimiting examples of the amine reactants are t-butylamine, t-hexyl primary amine, t-octyl primary amine, t-nonyl primary amine, t-decyl primary amine, t-dodecyl primary amine, t-tetradecyl primary amine, t-octadecyl primary amine, t-eicosyl primary amine, t-docosyl primary amine, t-tetracosyl primary amine, and t-triacontyl primary amine. The amine reactants can be prepared in several ways well known to those skilled in the art. Specific methods of preparing the t-alkyl primary amines are disclosed in the Journal of Organic Chemistry, vol. 20, page 295 et seq. (1955). Mixtures of such amines can be made from a polyolefin fraction (e.g., polypropylene and polybutylene cuts) by first hydrating with sulfuric acid and water to the corresponding alcohol, converting the alcohol to alkyl chloride with dry hydrogen chloride, and finally condensing the chloride with ammonia, under pressure, to produce a t-alkyl primary amine mixture.

The amic acids of this invention impart valuable properties to distillate fuels, i.e., gasoline and fuel oil. The fuel oils that are improved in accordance with this invention are hydrocarbon fractions having an initial boiling point of at least about 100° F. and an end-boiling point no higher than about 750° F., and boiling substantially continuously throughout their distillation range. Such fuel oils are generally known as distillate fuel oils. It is to be understood, however, that this term is not restricted to straight-run distillate fractions. The distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well known commercial methods, such as, acid or caustic treatment, hydrogenation, solvent refining, clay treatment, etc.

The distillate fuel oils are characterized by their relatively low viscosities, pour points, and the like. The principal property which characterizes the contemplated hydrocarbons, however, is the distillation range. As mentioned hereinbefore, this range will lie between about 100° F. and about 750° F. Obviously, the distillation range of each individual fuel oil will cover a narrower boiling range falling, nevertheless, within the above-specified limits. Likewise, each fuel oil will boil substantially continuously throughout its distillation range.

Particularly contemplated among the fuel oils are Nos. 1, 2, and 3 fuel oils used in heating and as diesel fuel oils, and the jet combustion fuels. The domestic fuel oils generally conform to the specifications set forth in A.S.T.M. Specifications D396–48T. Specifications for diesel fuels are defined in A.S.T.M. Specifications D975–48T. Typical jet fuels are defined in Military Specification MIL–F–5624B.

The gasolines that are improved by the amic acids and salts of this invention are as described hereinbefore. As is well known to the art, motor gasoline can be straight run gasoline or, as is more usual, it can be a blend of two or more cuts or materials including straight run stock, catalytic or thermal reformate, cracked stock, alkylate, natural gasoline, and aromatic hydrocarbons.

The amount of amic acid or amine salt of amic acid additives of this invention that is added to the distillate fuel in accordance with this invention will depend, of course, upon the intended purpose and the particular amic acid or salt selected, as they are not all equivalent in their activity. Some may have to be used in greater concentrations than others to be effective. In most cases, in which it is desired to obtain all three beneficial results in the case of fuel oil, namely, to inhibit sedimentation, to reduce screen clogging, and to prevent rusting of ferrous metal surfaces, additive concentrations varying between 10 pounds per thousand barrels of oil (about 0.004 weight percent) and about 200 pounds per thousand barrels of oil (about 0.004 weight percent) and about 200 pounds per thousand barrels of oil (about 0.08 weight percent) will be employed. It may not always be desired, however, to accomplish all three aforementioned results. In such cases, where it is desired to effect only one or two results, lower concentrations can be used. Thus, if it is desired only to prevent rust under dynamic conditions, as in a pipeline, it has been found that concentrations as low as about 2.5 p.p.m., i.e., about one half pound of additive per thousand barrels of oil (about 0.0004 weight percent), are effective. In gasoline the concentration of additive will vary between about 0.003 percent and about 0.05 percent, by weight, of the gasoline. In preferred practice, amounts varying between about 0.005 percent and about 0.05 percent, by weight, are used. In general, therefore, the amount of amic acid or of amine salt of amic acid that can be added to the distillate fuel, in order to achieve a beneficial result, will vary generally between about one half pound per thousand barrels of fuel and about 200 pounds per thousand barrels of fuel. Preferably, it will vary between about 10 pounds and about 200 pounds per thousand barrels of fuel.

If it is desired, the fuel oil compositions can contain other additives for the purpose of achieving other results. Thus, for example, there can be present foam inhibitors and ignition and burning quality improvers. Examples of such additives are silicones, dinitropropane, amyl nitrate, metal sulfonates, and the like.

The antistall additives of the invention may be used in the gasoline along with other antistall addition agents or other additives designed to impart other improved properties thereto. Thus, anti-knock agents, pre-ignition inhibitors, anti-rust agents, metal-deactivators, dyes, antioxidants, detergents, etc., may be present in the gasoline. Also, the gasoline may contain a small amount, from about 0.01 percent to about 1 percent, by weight, of a solvent oil or upperlube. Suitable oils, for example, include Coastal and Mid-Continent distillate oils having viscosities within the range of from about 50 to about 500 S.U.S. at 100° F. Synthetic oils, such as diester oils, polyalkylene glycols, silicones, phosphate esters, polypropylenes, polybutylenes and the like, may also be used.

The following specific examples are for the purpose of illustrating the amic acids and salts and the fuel compositions of this invention, and of exemplifying the specific nature thereof. It is to be strictly understood, however, that this invention is not to be limited by the particular additives and fuels, or to the operations and manipulations described therein. Other amic acids or amine salts thereof and fuels, as discussed hereinbefore, can be used, as those skilled in the art will readily appreciate.

AMIC ACIDS, SALTS, AND AMIDES

The salt-forming amine reactant used in the specific working examples is a mixture of pure amines. "Amine A" is a mixture of primary amines having a carbon atom of a tertiary butyl group attached to the amino ($-NH_2$) group and containing 12 to 15 carbon atoms per amine molecule and averaging 12 carbon atoms per molecule. This mixture contains, by weight, about 85 percent tertiary dodecyl amine, about 10 percent tertiary pentadecyl amine, and relatively small amounts, i.e., less than about 5 percent of amines having less than 12 or more than 15 carbon atoms.

Example 1

A mixture of 75 grams (1.0 mol) glycine and 300 grams (1 mol) tetrapropenylsuccinicanhydride were slowly heated with stirring to about 100°–115° C. The reaction mixture was stirred at 110–115° C. for about 3 hours to insure complete reaction.

Example 2

A mixture of 68.5 grams (0.5 mol) anthranilic acid and 150 grams (0.5 mol) tetrapropenylsuccinicanhydride were slowly heated with stirring to about 95°–100° C. The reaction mixture was stirred at 95°–100° C. for about 3 hours to insure complete reaction.

Example 3

A mixture of 37.5 grams (0.5 mol) glycine and 150 grams (0.5 mol) tetrapropenylsuccinicanhydride were slowly heated with stirring to about 110–115° C. The reaction mixture was stirred at 110–115° C. for about 3 hours. The mixture was cooled to about 50° C. and 100 grams (0.5 mol) Amine A was added. The mixture was stirred at 100° C. for about 3 hours to insure complete reaction.

Example 4

A mixture of 37.5 grams (0.5 mol) glycine and 150 grams (0.5 mol) tetrapropenylsuccinicanhydride were slowly heated with stirring to about 110–115° C. The reaction mixture was stirred at 110–115° C. for about 3 hours. The mixture was cooled to 50° C. and 200 grams (1.0 mol) Amine A was added. The mixture was stirred at 100° C. for about 3 hours to insure complete reaction.

Example 5

A mixture of 68.5 grams (0.5 mol) anthranilic acid and 150 grams (0.5 mol) tetrapropenylsuccinicanhydride were slowly heated with stirring to about 95–100° C. The reaction mixture was stirred at 95–100° C. for about 3 hours. The mixture was cooled to 50° C. and 100 grams (0.5 mol) Amine A was added. The mixture was stirred at 100° C. for about 3 hours to insure complete reaction.

Example 6

A mixture of 68.5 grams (0.5 mol) anthranilic acid and 150 grams (0.5 mol) tetrapropenylsuccinicanhydride were slowly heated with stirring to about 95–100° C. The reaction mixture was stirred at 95–100° C. for about 3 hours. The mixture was cooled to 50° C. and 200 grams (1.0 mol) Amine A was added. The mixture was stirred at 100° C. for about 3 hours to insure complete reaction.

Example 7

A mixture of 37.5 grams (0.5 mol) glycine and 150 grams (0.5 mol) tetrapropenyl succinic acid anhydride was slowly heated, with stirring, to about 100–115° C. The reaction mixture was stirred at 100–115° C. for about 3 hours. This product, the amic acid described in Example 1, was cooled to about 50° C. and 100 grams (0.5 mol) Amine A were added. The resulting mixture was then slowly heated to a final temperature of 200° C. About 9 grams (0.5 mol) water of condensation was evolved during this reaction stage, producing the mono-Amine A amide of the product of Example 1.

Example 8

A mixture of 37.5 grams (0.5 mol) glycine and 150 grams (0.5 mol) tetrapropenyl succinic acid anhydride was slowly heated, with stirring, to about 100–115° C. The reaction mixture was stirred at 100–115° C. for about 3 hours. This product, the amic acid described in Example 1, was cooled to about 50° C. and 200 grams (1 mol) Amine A were added. The resulting mixture was then slowly heated to a final temperature of 230° C. About 18 grams (1 mol) water of condensation was evolved during this reaction stage, producing the di-Amine A-amide of the product of Example 1.

Example 9

A mixture of 75 grams (1 mol) glycine and 224 grams (1 mol) of a branched chain nonenyl succinic acid anhydride were slowly heated with stirring to about 110° C. The reaction mixture was stirred at 110° C. for about 3 hours to insure complete reaction.

Example 10

A mixture of 105 grams (0.25 mol) of 11-tricosenyl ($C_{23}$) succinic acid anhydride and 18.8 grams (0.25 mol) glycine was stirred at 120° C. for 3 hours and at 130° C. for four hours to insure complete reaction.

Example 11

A mixture of 213 grams (0.36 mol) of 17-pentatricontenyl ($C_{35}$) succinic acid anhydride and 27 grams (0.36 mol) glycine was stirred at 120° C. for 3 hours and at 130° C. for 3 hours to insure complete reaction.

SEDIMENTATION

The test used to determine the sedimentation characteristics of the fuel oils is the 110° F. storage test. In this test, a 500-milliliter sample of the fuel oil under test is placed in a convected oven maintained at 110° F. for a period of 12 weeks. Then, the sample is removed from the oven and cooled. The cooled sample is filtered through a tared asbestos filter (Gooch crucible) to remove insoluble matter. The weight of such matter in milligrams is reported as the amount of sediment. A sample of the blank, uninhibited oil is run along with a fuel oil blend under test. The effectiveness of a fuel oil containing an inhibitor is determined by comparing the weight of sediment formed in the inhibited oil with that formed in the uninhibited oil.

Additives described in the examples were blended in test fuel oil and the blends were subjected to the 110° F. storage test. The test results comparing the blended fuels and uninhibited fuels are set forth in Table I. The test fuel oil was a blend of 80 percent distillate stock obtained from continuous catalytic cracking and 20 percent straight-run distillate stock. It has a boiling range of between about 320° F. and about 640° F. and is a typical No. 2 fuel oil.

Table I

110° F. STORAGE TEST—12 WEEKS

| Additive of Example | Conc'n., lbs./1,000 bbls. | Sediment mg./liter |
|---|---|---|
| Blank | | 34 |
| 1 | 50 | 30 |
| Blank | | 12 |
| 3 | 25 | 3 |
| 4 | 25 | 3 |
| 5 | 25 | 4 |
| 6 | 35 | 2 |
| 7 | 25 | 4 |
| 8 | 25 | 3 |
| 10 | 25 | 5 |
| 11 | 25 | 6 |

SCREEN CLOGGING

The anti-screen clogging characteristics of a fuel oil were determined as follows: The test is conducted using a Sunstrand V3 or S1 home fuel oil burner pump with a self-contained 100-mesh Monel metal screen. About 0.05 percent, by weight, of naturally-formed fuel oil sediment, composed of fuel oil, water, dirt, rust, and organic sludge is mixed with 10 liters of the fuel oil. The mixture is circulated by the pump through the screen for 6 hours. Then, the sludge deposit on the screen is washed off with normal pentane and filtered through a tared Gooch crucible. After drying, the material in the Gooch crucible is washed with a 50–50 (volume) acetone-methanol mixture. The total organic sediment is obtained by evaporating the pentane and the acetone-methanol filtrates. Drying and weighing the Gooch crucible yields the amount of inorganic sediment. The sum of the organic and inorganic deposits on the screen can be reported in milligrams recovered or converted into percent screen clogging.

Blends of the additives of the examples were prepared in the aforedescribed test fuel oil and subjected to the screen clogging test. Results are set forth in Table II.

Table II

SCREEN CLOGGING

| Additive of Example | Conc'n., lbs. 1,000 bbls. | Screen Clogging percent |
|---|---|---|
| Blank | | 100 |
| 1 | 25 | 5 |
| 2 | 25 | 16 |
| 3 | 25 | 3 |
| 4 | 25 | 6 |
| 5 | 50 | 35 |
| 6 | 50 | 19 |
| 7 | 25 | 12 |
| 8 | 25 | 8 |
| 9 | 50 | 6 |
| 10 | 25 | 1 |
| 11 | 25 | 5 |

RUSTING

The method used for testing anti-rust properties of gasolines was the A.S.T.M. rust test D–665 operated for 48 hours at 80° F. using distilled water. This is a dynamic test that indicates the ability to prevent rusting of ferrous metal surfaces in pipelines, tubes, etc.

Blends of the additives described in the examples in the test gasoline were subjected to the A.S.T.M. rust test D–665. This test gasoline was a blend of 80 volume percent catalytically cracked gasoline and 20 volume percent straight run gasoline, which had a boiling range of 100° F. to 400° F. Pertinent data are set forth in Table III.

Table III
A.S.T.M. RUST TEST D-665

| Additive of Example | Conc'n., parts per million | Rust Test Result |
|---|---|---|
| Blank | | Fail. |
| 1 | 2.5 | Pass. |
| 2 | 5 | Do. |
| 3 | 2½ | Do. |
| 4 | 2½ | Do. |
| 5 | 10 | Do. |
| 6 | 10 | Do. |
| 7 | 10 | Do. |
| 8 | 10 | Do. |
| 9 | 5 | Do. |
| 10 | 10 | Do. |
| 11 | 25 | Do. |

The static rust test simulates conditions encountered in storage tanks, such as, the home fuel oil storage tank. In this test, a strip of 16–20 gauge sand blasted steel plate is placed in a clear quart bottle. The length of the strip is sufficient to reach from the bottom of the bottle into the neck of the bottle without interfering with the cap. One hundred cc. of synthetic sea water with pH adjusted to 5 (A.S.T.M. D–665) and 750 cc. of test oil are placed in the bottle. The bottle is capped tightly, shaken vigorously for one minute, and permitted to stand quietly at 80° F. for 21 days. At the end of that time, the amount of rust that occurs on the surface of the plate immersed in the water is used as a measure of effectiveness of the fuel to inhibit rusting in storage vessels. It is generally preferred that no more than 5 percent of the surface should be rusted. This test is much more severe than the A.S.T.M. rust test. Many additive compositions that pass the A.S.T.M. test fail in the static test. On the other hand materials that pass the static test always pass the A.S.T.M. test.

Blends of the additives of the examples in the aforedescribed test fuel oil were subjected to the static rust test. Pertinent results are set forth in Table IV.

Table IV
STATIC RUST TEST

| Additive of Example | Conc'n., lbs./1,000 bbls. | Percent Rusting |
|---|---|---|
| Blank | | 100 |
| 1 | 25 | 0 |
| 2 | 25 | 0 |
| 3 | 25 | 5 |
| 4 | 25 | 0 |
| 5 | 25 | 40 |
| 6 | 25 | [1] 70 |
| 7 | 25 | 10 |
| 9 | 50 | 0 |
| 10 | 50 | 30 |
| 11 | 50 | [1] 70 |

[1] (Lt.).

It will be apparent, from the data set forth in Tables I through IV, that the amic acids of this invention, and amides and amine salts thereof, are highly effective to reduce sedimentation and screen clogging and to inhibit rusting of ferrous metal surfaces. As is to be expected results will vary among specific materials used. In order to accomplish any given improvement, many of the additives can be used in relatively small amounts, as for dynamic rust prevention. If, on the other hand, it is desired to accomplish all the aforementioned beneficial results, this can be accomplished at the practical additive concentration of 50–100 pounds per thousand barrels of fuel oil.

ANTISTALLING EFFECTIVENESS

The ability of the succinamic acids of this invention to inhibit engine stalling is demonstrated in the following test:

A standard Chevrolet engine, equipped with a Holley single downdraft carburetor, was mounted in a "cold" room refrigerated to 50° F. A Holley carburetor was used. A thermocouple was attached to the throttle plate shaft to record the plate temperature. A ½-inch insulating gasket was placed between the carburetor and manifold to prevent heat conduction. An asbestos sheet covered the entire manifold system to shield the carburetor from convection and radiation. A spray chamber was used to saturate the incoming air with moisture before entering an ice tower which cooled the air to about 35° F.

In conducting a test, the engine was first run to about 10 minutes at 2000 r.p.m. to bring the engine temperature to equilibrium. The engine was then shut off. When the throttle shaft temperature rose to 40° F., the engine was restarted with the idle speed set at 400 to 500 r.p.m. so that the base fuel stalled at idle in 10 seconds or less after a run-time of 20 to 40 seconds. Run-time means the time that the engine was run at 2000 r.p.m. before returning to idle.

All runs were started when the throttle shaft reached 40° F. At the instant of starting, the throttle arm was moved to the 2000 r.p.m. position and a stop watch started. At the end of the selected run-time, the throttle arm was moved to the idle position. The time required to stall was recorded. Several tests were made at each run-time and averaged.

In evaluating an additive, the base fuel was first tested followed by several concentrations of the additive. The system was flushed between tests with the fuel to be run next. Any improvement caused by the additive was reflected in a longer run-time (as compared to the base fuel) to cause stalling in 10 seconds or less when the engine was idled. The more effective the additive, the longer the run-time.

The test gasoline was a blend of 66 percent catalytically cracked component, 6 percent natural gasoline, 12 percent benzene, 8 percent toluene, and 8 percent butane. It had a boiling range of 85°–402° F and a mid-boiling (50 percent) point of 198° F.

Blends of additives of this invention in the test gasoline were prepared. These blends were subjected to the Chevrolet engine test and compared with uninhibited gasoline. The effectiveness will be evident from pertinent data set forth in Table V.

Table V
ANTISTALLING TEST

| Inhibitor | Conc'n., Wt. percent | Run Time to 10 sec., Stall Time (Sec.) |
|---|---|---|
| Base gasoline | 0 | 60 |
| Fuel+Example 1 | 0.01 | 90 |
| Fuel+Example 2 | 0.01 | 110 |
| Fuel+Example 4 | 0.01 | 90 |
| Fuel+Example 7 | 0.01 | 160 |
| Fuel+Example 9 | 0.01 | 100 |
| Fuel+Example 10 | 0.01 | 110 |
| Fuel+Example 11 | 0.01 | 80 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A petroleum distillate fuel containing between about 0.5 pound per thousand barrels and about 200 pounds per thousand barrels of a compound selected from the group consisting of (1) amic acids of glycine and alkenyl succinic acid anhydride having about between 8 carbon atoms and about 35 carbon atoms in the alkenyl group, (2) amic acids of anthranilic acid and alkenyl succinic acid anhydride having about between 8 carbon atoms and about 35 carbon atoms per alkenyl group, (3) the mono- and di-salts of (1) and (2) with tertiary alkyl primary amines having tertiary carbon atom attached to the nitrogen atom and containing between about 4 carbon atoms and about 30 carbon atoms per tertiary alkyl radical, and (4) monoamides and diamides of (1) and (2) with tertiary alkyl primary amines having a tertiary carbon atom attached to the nitrogen atom and containing between about 4 carbon atoms and about 30 carbon atoms per tertiary alkyl radical.

2. The composition defined in claim 1, wherein said distillate fuel is a distillate fuel oil and said compound is present at concentrations varying between about 10 pounds per thousand barrels and about 200 pounds per thousand barrels.

3. The composition defined in claim 1, wherein said distillate fuel is gasoline and said compound is present in a concentration of between about 10 pounds per thousand barrels and about 200 pounds per thousand barrels.

4. A distillate fuel oil containing between about 10 pounds per thousand barrels and 200 pounds per thousand barrels of the amic acid of glycine and tetrapropenyl succinic acid anhydride.

5. A distillate fuel oil containing between about 10 pounds per thousand barrels and about 200 pounds per thousand barrels of the amic acid of glycine and nonenyl succinic acid anhydride.

6. A distillate fuel oil containing between about 10 pounds per thousand barrels and about 200 pounds per thousand barrels of the amic acid of 11-tricosenyl succinic acid anhydride and glycine.

7. A distillate fuel oil containing between about 10 pounds per thousand barrels and about 200 pounds per thousand barrels of the amic acid of glycine and 17-pentatriacontyl succinic acid anhydride.

8. A distillate fuel oil containing between about 10 pounds per thousand barrels and about 200 pounds per thousand barrels of the amic acid of anthranilic acid and tetrapropenyl succinic acid anhydride.

9. A distillate fuel oil containing between about 10 pounds per thousand barrels and about 200 pounds per thousand barrels of a monoamine salt of the amic acid of anthranilic acid and tetrapropenyl succinic acid anhydride; wherein the salt-forming amine is a mixture of tertiary-alkyl primary amines containing, by weight, about 85 percent tertiary dodecyl amine and about 10 percent tertiary pentadecyl amine.

10. A distillate fuel oil containing between about 10 pounds per thousand barrels and about 200 pounds per thousand barrels of a diamine salt of the amic acid of anthranilic acid and tetrapropenyl succinic acid anhydride; wherein the salt-forming amine is a mixture of tertiary-alkyl primary amines containing, by weight, about 85 percent tertiary dodecyl amine and about 10 percent tertiary pentadecyl amine.

11. A distillate fuel oil containing between about 10 pounds per thousand barrels and about 200 pounds per thousand barrels of a monoamine salt of the amic acid of glycine and tetrapropenyl succinic acid anhydride; wherein the salt-forming amine is a mixture of tertiary-alkyl primary amines containing, by weight, about 85 percent tertiary dodecyl amine and about 10 percent tertiary pentadecyl amine.

12. A distillate fuel oil containing between about 10 pounds per thousand barrels and about 200 pounds per thousand barrels of a diamine salt of the amic acid of glycine and tetrapropenyl succinic acid anhydride; wherein the salt-forming amine is a mixture of tertiary-alkyl primary amines containing, by weight, about 85 percent tertiary dodecyl amine and about 10 percent tertiary pentadecyl amine.

13. A distillate fuel oil containing between about 10 pounds per thousand barrels and about 200 pounds per thousand barrels of a monoamide of the amic acid of glycine and tetrapropenyl succinic acid anhydride; wherein the amide-forming amine is a mixture of tertiary-alkyl primary amines containing, by weight, about 85 percent tertiary dodecyl amine and about 10 percent tertiary pentadecyl amine.

14. A distillate fuel oil containing between about 10 pounds per thousand barrels and about 200 pounds per thousand barrels of a diamide of the amic acid of glycine and tetrapropenyl succinic acid anhydride; wherein the amide-forming amine is a mixture of tertiary-alkyl primary amines containing, by weight, about 85 percent tertiary dodecyl amine and about 10 percent tertiary pentadecyl amine.

15. A gasoline containing between about 10 pounds per thousand barrels and about 200 pounds per thousand barrels of the amic acid of glycine and tetrapropenyl succinic acid anhydride.

References Cited in the file of this patent

UNITED STATES PATENTS

| | | |
|---|---|---|
| 2,191,738 | Balle | Feb. 27, 1940 |
| 2,215,367 | Balle et al. | Sept. 17, 1940 |
| 2,368,067 | Lynch | Jan. 23, 1945 |
| 2,604,451 | Rocchini | July 22, 1952 |
| 2,702,820 | Tummes et al. | Feb. 22, 1955 |
| 2,717,908 | Snyder | Sept. 13, 1955 |
| 2,790,779 | Spivack et al. | Apr. 30, 1957 |
| 2,851,345 | Marsh et al. | Sept. 9, 1958 |
| 2,867,654 | Town | Jan. 6, 1959 |
| 2,902,353 | Becker et al. | Sept. 1, 1959 |

FOREIGN PATENTS

| | | |
|---|---|---|
| 1,196,501 | France | May 25, 1959 |

UNITED STATES PATENT OFFICE

CERTIFICATE OF CORRECTION

Patent No. 3,039,861                          June 19, 1962

Harry J. Andress, Jr., et al.

It is hereby certified that error appears in the above numbered patent requiring correction and that the said Letters Patent should read as corrected below.

Column 5, lines 34 and 35, strike out "(about 0.004 weight percent) and about 200 pounds per thousand barrels of oil".

Signed and sealed this 23rd day of October 1962.

(SEAL)
Attest:

ERNEST W. SWIDER                          DAVID L. LADD
Attesting Officer                            Commissioner of Patents